United States Patent Office 3,377,389
Patented Apr. 9, 1968

3,377,389
PROCESS FOR THE CYCLODIMERIZATION OF UNSATURATED COMPOUNDS AND PRODUCTS RESULTING THEREFROM
Karl Griesbaum, Elizabeth, N.J., assignor to Esso Research and Engineering Company, a corporation of Delaware
No Drawing. Filed Apr. 20, 1965, Ser. No. 449,605
20 Claims. (Cl. 260—648)

ABSTRACT OF THE DISCLOSURE

This disclosure relates to a process for the cyclodimerization of unsaturated hydrocarbon compounds such as allene, homologs of allenes, homologs of acetylenes, and mixtures thereof by the ionic addition thereto of hydrogen chloride or hydrogen bromide. The resulting cyclodimerized products are of utility as lachrymators and as highly valuable intermediates suitable for use in the preparation of other and related chemical products such as the corresponding diene, dinitrile, bisaminomethyl, diol, etc.

---

This invention, in general relates to the cyclodimerization of unsaturated compounds and, in particular, to the ionic addition of hydrogen chloride and hydrogen bromide to unsaturated compounds such as homologs of allenes and acetylenes.

It is known from the art that ionic additions of HX compounds to certain unsaturated compounds, including allene and methylacetylene, occur in accordance with Markovnikov's Rule. In the latter two cases it has been consistently reported that the reactions yield 2-substituted propenes and/or 2,2-disubstituted propanes. This reaction may be represented as follows:

(I)    $CH_2=C=CH_2 + HX \longrightarrow CH_3C \equiv CH + HX$
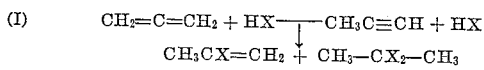
       $CH_3CX=CH_2 + CH_3-CX_2-CH_3$ Specific examples of this reaction are typified by the acid-catalyzed hydration of allene, e.g. (Gustavson and N. Demjanoff, J. prakt. Chem. [2], 88, 201 (1888)), and by the acid-catalyzed hydration of methylacetylene, e.g. (R. E. Schaad and V. N. Ipatieff, J. Am. Chem. Soc., 62, 178 (1940)), so as to yield acetone in both instances. Other typical examples include the addition of hydrogen fluoride to each of the two above substrates, i.e. allene and methylacetylene, so as to produce 2,2-difluoropropane, the hydrochlorination of allene and methylacetylene so as to yield 2,2-dichloropropane and/or 2-chloropropene and the hydrobromination of methylacetylene to yield 2,2-dibromopropane.

In view of the teaching of the prior art, it is indeed surprising that a process can be effected which involves the addition of certain hydrogen halide compositions, i.e. hydrogen bromide and hydrogen chloride to certain unsaturated compounds, i.e. allene and $C_1$–$C_9$ monoalkyl-allenes and $C_1$–$C_{10}$ alkylacetylenes so as to produce cyclodimerized products of said starting unsubstituted compounds. For example, in accordance with this invention it has been found that the hydrogen bromide addition to allene produces substantial amounts of the cyclodimerization products, cis- and trans- 1,3-dibromo-1,3-dimethyl-cyclobutane. In this regard, while not wishing to be bound by a particular theory, it is believed that a vinyl carbonium ion may be a critical intermediate in the novel cyclization reaction of the present invention. The following equations fully illustrate that, contrary to the above-cited state of the art, the reaction may be utilized to produce substantial amounts of cyclic products. These reactions may be illustrated as follows wherein allene and methylacetylene are employed as starting reactants to produce the cyclic products:

(II)
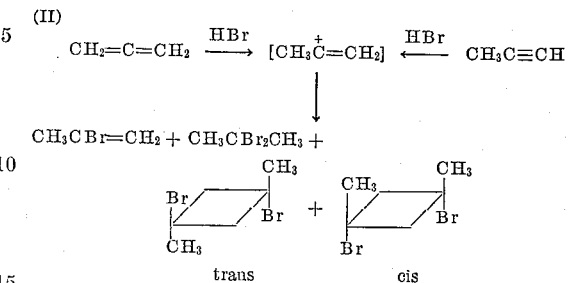

$CH_3CBr=CH_2 + CH_3CBr_2CH_3 +$

 trans            cis

One class of unsaturated compounds which is suitably utilized in the process of this invention include a group of allene homologs which is reactive to cyclodimerization under the conditions employed in this invention, which group of allene homologs may be represented by the general formula:

(III)
$$\begin{array}{c} R \\ \diagdown \\ C=C=CH_2 \\ | \\ H \end{array}$$

wherein R represents a member selected from the group consisting of hydrogen and alkyl. Preferably, R is such that the allene utilized contains from 3 to 13 carbon atoms. Typical non-limiting examples of such allene homologs include allene (propadiene) 1,2-pentadiene (ethylpropadiene), 1,2-butadiene, 1,2-hexadiene, 3-ethyl-pentadiene-1,2 (diethylpropadiene) and the like.

Another class of unsaturated compounds which is suitable for use in the process of this invention include a group of acetylene homologs. As above, these acetylenes represent compounds which are reactive to cyclodimerization reactions under the conditions employed herein. This group of acetylenes may be represented by the general formula:

(IV)              $R-C \equiv CH$ wherein R is an alkyl group, preferably a $C_1$–$C_{10}$ essentially unbranched alkyl group. Accordingly, it is preferred that the acetylenes utilized contain from 3 to 12 carbon atoms in their structure. Non-limiting examples of those specific acetylenes which may be used herein are methylacetylene through decylacetylene and the like.

Whereas the above formulas define preferred classes of compounds comprising alkyl homologs of allene and acetylene, it is to be understood that other unsaturated compounds are contemplated by the process of the present invention and are limited solely by their reactiveness with relation to the cyclodimerization reaction which, in turn, may be affected in a limiting sense by reaction conditions, reactants utilized, etc. Hence it is also contemplated that the R of the above formulas may represent aryl, alkaryl, aralkyl, hydroxy-substituted alkyl, cycloalkyl, and the like. In addition, any of the suitably utilized unsaturated compounds represented above may contain one or more inert substituent groups such as, for example, nitrate, alkoxide, halogen, cyano, ester, carboxylic, hydroxy groups, and the like.

In one embodiment, which is commercially preferred, a mixture of two or more of the above unsaturated compounds may be utilized. For example, a mixture comprising about 60% of allene and methylacetylene and about 40% propylene is advantageously utilizable in the process of this invention. This economically favorable composition is identified as "MAPP Gas" which is commercially available from the Dow Chemical Corporation.

The cyclodimerized products of the present invention are prepared by reacting a suitable unsaturated compound with a hologenated acid selected from the group consisting of hydrogen chloride and hydrogen bromide at temperatures of from about −100° to +50° C., preferably −80° to +25° C., and pressures of from less than 1 to 200 atmospheres or higher, preferably 1 to 10 atmospheres. Use of the lower range of temperatures is deemed critical to the present invention inasmuch as such lower temperatures promote a higher selectivity to the desired cyclodimerized compounds. In order to further promote the reaction, a Lewis acid catalyst may be used such as a metal halide catalyst. The metal halide catalysts for example, bismuth trichloride or boron trifluoride are preferred herein.

The reaction is preferably carried out in the liquid phase. If desired, a solvent such as hydrocarbon solvents or dry ethyl ether may be utilized. Generally, however, solvents are not used inasmuch as they are not found to be necessary when superatmospheric pressures and relatively higher temperatures are employed. While the liquid phase is preferably employed, the reaction may also be carried out in the gaseous phase.

In order to preferentially obtain the cyclodimerized products of the present invention, about 0.1 to 10 moles of hydrogen halide per mole of unsaturated compound, preferably 1 to 2 moles of said halogen acid, are employed per mole of unsaturated material.

In a preferred embodiment of this invention, allene or methylacetylene is reacted with hydrogen bromide or hydrogen hydrochloride, the latter preferentially in the presence of bismuth trichloride catalyst at temperatures of from −80° to +20° C. and pressures of from less than 1 to 30 atmospheres. Also, in the preferred preparation of the cyclodimerization products of this invention, it is preferred to utilize amounts of hydrogen chloride or hydrogen bromide in the range of about 0.1 to 10 moles and preferably from about 1 to 2 moles per mole of unsaturate used.

The general procedure for the addition reaction to produce the cyclodimerized products of this invention involves adding allene and or methylacetylene to a hydrogen halide, preferably in equimolar amounts. The reactants are condensed into an evacuated reaction vessel, for example, at the temperature of liquid nitrogen. The mixture is then transferred into a cold bath and maintained at a temperature of from about −70° to about −80° C. After a suitable length of time, the reaction mixture is allowed to gradually reach room temperature while the unreacted gases are allowed to evaporate.

Isolation of the cyclic products is deemed critical in order to accomplish the objects of the present invention. Accordingly, the crude adduct mixture is fractionated, e.g. at a temperature of 70° C. at atmospheric pressure, where the hydrogen halide employed was hydrogen chloride preferably at reduced pressure to remove the lower boiling 2-halopropenes and 2,2-dihalopropanes. The temperature and pressure utilized is dictated by the specific products being fractionated and the respective boiling points thereof. The resulting residue contains the cyclic compounds in an admixed amount. The mixed geometric isomeric cyclic halides of this invention can be obtained by adding a suitable material, e.g. pentane, and the like, to the distillation residue and cooling the mixture for relatively short period of time to a temperature of from about −70° to −80° C.

In addition to the foregoing all for purposes of further separation, the isomer mixture may be separated into the pure isomeric compounds, by preparative gas-liquid chromatography, by crystallization, by sublimation, by high vacuum distillation, or by any other conventional means of separation known to those skilled in the art.

In a preferred embodiment of the present invention wherein a higher selectivity to the desired cyclodimerized products is attained, the crude adduct mixture is initially separated using any of the separation operations hereinbefore described. The crude adduct mixture is thus separated into a lower boiling fraction comprised of essentially linear by-products and a higher boiling fraction comprised of the cyclodimerized product. This latter, higher boiling fraction may be recovered by conventional techniques utilizing conventional means. In accordance with this embodiment, the lower boiling fraction is subjected to a dehydrohalogenation reaction which splits off hydrogen halide from the lower boiling fraction and thereby resulting in a mixture of hydrogen halide and unsaturated compound, i.e. allene-allene homolog, which mixture is then recycled to the initial reaction zone to be further subjected to the cyclodimerization reaction therein.

The resulting products find utility as lachrymators and in addition, as highly valuable intermediates suitable for use in the preparation of other and related chemical products. For example, the addition of hydrogen chloride to allene produces 1,3-dichloro-1,3-dimethylcyclobutane which can be converted to the corresponding diene, dinitrile, bisaminomethyl, diol and the like by known reactions.

The following examples are typical of the conditions utilized in the process of the present invention and illustrate the products resulting from typical procedures. It must be realized, however, that the invention is not to be unduly restricted to the scope of said experiments inasmuch as such experiments are presented for the purpose of illustration only. In effecting these experiments certain general procedures for the addition of hydrogen halides to allene or methylacetylene, preparative gas-liquid chromatography, and the method of analysis were employed as follows:

EXPERIMENTAL

*General procedure for the addition of hydrogen halides to allene or methylacetylene.*—The low temperature addition reactions were carried out in 100-ml. Pyrex tubes which were closed at the top by a Teflon-tipped needle valve (from Fisher & Porter Co., Clifton, N.J.). Allene (or methylacetylene) and the hydrogen halide were condensed into the previously evacuated tubes at the temperature of liquid nitrogen. Then the closed tubes were transferred into a Freon bath, kept at −70° to −80° by means of a low temperature circulating unit (from Lawler Electrical Mfg. Co., Bayonne, N.J.). After an arbitrary period of reaction time (see Table I), the tubes were transferred to a liquid nitrogen bath and opened. The unreacted gases were allowed to evaporate through a drying tube filled with anhydrous calcium sulfate ("Drierite"). The remaining adduct mixtures in the tubes were colorless to slightly yellow mobile liquids.

In order to increase the reaction rate, certain "warm-up" experiments were carried out in a 300-ml. cylindrical Pyrex tube whose outlet was connected to a cold trap and then to a drying tube through which nitrogen was purged continuously.

The crude adduct mixtures from these addition reactions were in each case fractionated in order to remove most of the conventional, liquid Markovnikov-type adducts. In the case of the hydrogen bromide-adduct mixtures, the distillation was discontinued after the fraction boiling at 54°–56° and 85–90 mm. was collected, and in the case of the hydrogen chloride adduct mixtures, after the fraction boiling at 69°–70° was collected. The remaining liquid distillation residue was in each case further separated by preparative g.l.c. if the pure isomers were the desired products. The dibromo compounds could be also obtained as a crystalline mixture consisting of approximately 5–10% of the cis- and 90–95% of the trans-isomer by crystallization of the above distillation residue in cold pentane.

*Preparative gas liquid chromatography.*—The separation of the isomeric 1,3-dihalo-1,3-dimethylcyclobutanes was carried out on an Aerograph Autoprep Model A-700. A 20-ft., ⅜ inch. i.d. column, packed with 20% silicone on Chromosorb was used. Operating conditions for the separation of the isomeric 1,3-dichloro-1,3-dimethylcyclobutanes were as follows: Detector cell temperaure, 150°; detector cell current, 200 ma; injector part temperature, 148°; collector temperature 123°; column temperature, 113°; helium flow, 80 cc./min. For the separation of the isomeric 1,3-dibromo-1,3-dimethylcyclobutanes, the conditions were the following: detector cell temperature, 160°; detector cell current, 200 ma; injector part temperature, 150°; collector temperature, 130°; column temperature, 130°, helium flow, 140 cc./min. The corresponding isomers were in each case collected as colorless, crystalline materials.

The following Table I sets forth the examples which more clearly manifest the scope of the invention.

period of four days. Such reaction resulted in 0.7 gram of an orange liquid. Said liquid contained 9% of 1,3-dichloro-1,3-dimethylcyclobutane.

Example 18

This example serves to illustrate the uncatalyzed addition of HCl to allene. Five grams of HCl and 6.2 milliliters of allene were reacted in a glass tube at a temperature of about −70° C. for a reaction period of 6 days. A colorless adduct product resulted from such reaction. Upon analysis, it was found that such product contained 57% of 1,3-dichloro-1,3-dimethylcyclobutane.

Example 19

This example serves to illustrate the BiCl₃-catalyzed addition of hydrogen chloride to allene. In this example, 9.2 grams of HCl, 9.7 grams of allene and 0.6 gram of TABLE I.—EXPERIMENTAL AND ANALYTICAL DATA OF IONIC ADDITIONS OF HX COMPOUNDS TO ALLENE AND METHYLACETYLENE

| Ex. No. | HX | Substrate | Ratio of HX:C₃H₄ | Temp., °C. | Time, days | Conversion,[b] percent | Relative Amounts of Components in Adduct Mixture, wt. percent [a] | | | Cyclic Isomer | |
|---|---|---|---|---|---|---|---|---|---|---|---|
| | | | | | | | XCH=CHCH₃ | CH₃CX=CH₂ | CH₃CX₂CH₃ | Trans | Cis |
| 1 | HCl | CH₂=C=CH₂ | 1 | −70 | 6 | <1 | | 5 | 8 | [c] 77 | 10 |
| 2 | HCl | CH₂=C=CH₂ | 1 | −70 | 14 | [d] 12 | | 35 | 54 | 8 | 3 |
| 3 | HCl | CH₂=C=CH₂ | 1 | ambient | 7 | 58 | | 30 | 69 | 1 | <1 |
| 4 | HCl | CH₂=C=CH₂ | 1 | −70 | 14 | [e] 3 | | 17 | 52 | 25 | 6 |
| 5 | HCl | CH₃C≡CH | 1 | −70 | 7 | 1 | | 56 | 44 | | |
| 6 | HBr | CH₂=C=CH₂ | 0.8 | −80 | 6 | 40 | | 17 | 36 | 39 | 8 |
| 7 | HBr | CH₂=C=CH₂ | 1 | −70 | 28 | 42 | | 13 | 35 | 44 | 8 |
| 8 | HBr | CH₂=C=CH₂ | 1 | −70 to [f] ambient | 4 | 65 | | 31 | 42 | 21 | 6 |
| 9 | HBr | CH₂=C=CH₂ | 1 | ambient | 3 hrs. | [g] 8 | | 15 | 72 | 10 | 3 |
| 10 | HBr | CH₃C≡CH | 1 | −70 | 4.5 | 54 | 30 | 17(24) | 24(34) | 23(33) | 6(9) |
| 11 | HBr | CH₃C≡CH | 1 | −70 | 4 | [h] 6 | 6 | 56(60) | 25(27) | 9(10) | 3(3) |
| 12 | HBr | CH₃C≡CH | 0.6 | −70 | 3 | 31 | | 6 | 16 | 60 | 18 |
| 13 | HI | CH₂=C=CH₂ | 1 | −70 | 3 | 71 | | 6 | 94 | | |
| 14 | HI | CH₃C≡CH | 1 | −70 | 1 | 86 | | 35 | 65 | | |

[a] These components comprised 75-98% of the total adduct mixtures depending on the purity of the starting materials. Typical by-products were CH₃CHClCH₃ and CH₃CHBrCH₃, formed by addition of HCl or HBr to a propylene impurity, and CH₃CClBrCH₃, formed by the addition of HBr to a 2-chloropropene impurity.
[b] Based on product distribution and hydrogen halide.
[c] The high yield of cyclic product in this case may be due to the fact that the lower boiling sample adducts evaporated partly during removal of the unreacted starting materials.
[d] Reaction carried out in a stainless steel bomb.
[e] 6.5% BiCl₃ as catalyst.
[f] Reaction mixture was allowed to gradually warm up from −70° to room temperature.
[g] Gas phase reaction.
[h] Hydroquinone used as inhibitors.

Example 15

Sixteen grams of allene and 32 grams of HBr were sealed into a glass tube at the temperature of liquid nitrogen. The tube was then transferred to a Freon bath, whose temperature was maintained between about −70 and −80° C. After a period of 7 days, the tube was opened and the unreacted gases contained therein were allowed to evaporate and the remaining colorless liquid (27.7 grams) was analyzed by gas chromatography and NMR.

In order to isolate the desired trans-1,3-dibromo-1,3-dimethyl-cyclobutane from the remaining constituents of the crude adduct mixture, e.g. 2-bromopropene and 2,2-dibromopropane, said crude adduct mixture was diluted with an equal amount of n-pentane and the mixture was cooled to −80° C. The colorless solid precipitate was filtered off. Repeated crystallization from pentane and sublimation in vacuo afforded a clean product, having a melting point of 53° C.

Example 16

Eight grams of HBr and four grams of methylacetylene were reacted in a glass tube at a temperature of −70° C. for a period of 41 hours. Such reaction yielded 6 grams of a colorless liquid adduct. Such colorless liquid adduct yielded 10% of 1,3-dichloro-1,3-dimethylcyclobutane.

Example 17

Eight grams of hydrogen bromide, four grams of allene and 1.1 gram of hydroquinone were reacted in a glass tube at a temperature of about −70° C. for a reaction BiCl₃ were reacted at a temperature of about −70° C. in a glass tube for a reaction period of about 14 days. A pink liquid was produced. Upon analysis, it was determined that this pink liquid contained 30% of 1,3-dichloro,1,3-dimethylcyclobutane.

As mentioned above, examples do not intend to limit the scope of the invention but are presented as an aid so that the invention may be more easily understood and performed.

What is claimed is:

1. A process for the preparation of cyclodimerized products which comprises reacting an unsaturated hydrocarbon compound selected from the group consisting of allene, homologs of allenes, homologs of acetylenes, and mixtures thereof with hydrogen bromide at temperatures of from about −100° to +50° C. and pressures of from less than 1 to 200 atmospheres, the mole ratio of hydrogen bromide to said compound being about 1:1, separating the resulting cyclodimerized product from the reaction mixture as a bottoms fraction by distillation, and recovering said cyclodimerized product from said bottoms fraction by crystallization from cold pentane.

2. The process of claim 1 wherein the unsaturated compound is a homolog of allene represented by the general formula:

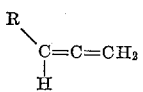

wherein R represents an alkyl group having from 1 to 9 carbon atoms.

3. The process of claim 1 wherein the unsaturated compound comprises a homolog of acetylene represented by the general formula:

$$RC{\equiv}CH$$

wherein R represents an alkyl group.

4. A process for the preparation of cyclodimerized compounds which comprises contacting a $C_3$–$C_{13}$ allene having the general formula:

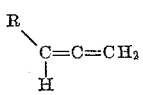

wherein R represents a member selected from the group consisting of hydrogen and alkyl having from 1 to 9 carbon atoms with hydrogen bromide in the absence of a catalyst at temperatures of from about $-100°$ to $+50°$ C. and pressures of from less than 1 to 200 atmospheres, the mole ratio of hydrogen bromide to said allene being about 1:1, separating the resulting cyclodimerized products as a bottoms fraction by distillation, and recovering said cyclodimerized products from said bottoms fraction by crystallization from cold pentane.

5. The process of claim 1 wherein said reaction is carried out in the liquid-phase.

6. The process of claim 1 wherein from about 0.1 to 10 moles of said halogen halide are employed per mole of unsaturated compound.

7. A process for the preparation of cyclodimerized compounds which comprises contacting a $C_3$–$C_{12}$ acetylene having the general formula:

$$RC{\equiv}CH$$

wherein R represents an alkyl group having from 1 to 10 carbon atoms with hydrogen bromide in the absence of a catalyst at temperatures of from about $-100°$ to $+50°$ C. and pressures of from less than 1 to 200 atmospheres, the mole ratio of hydrogen bromide to said acetylene being about 1:1, separating the resulting cyclodimerized products as a bottoms fraction by distillation, and recovering said cyclodimerized products from said bottoms fraction by crystallization from cold pentane.

8. The process of claim 7 wherein said reaction is carried out in the liquid-phase.

9. The process of claim 7 wherein from about 0.1 to 10 moles of said halogen halide are employed per mole of unsaturated compound.

10. A process for the preparation of cyclodimerized products which comprises reacting an unsaturated compound selected from the group consisting of allene, homologs of allenes, homologs of acetylenes, and mixtures thereof with hydrogen bromide in a reaction zone at temperatures of from about $-100°$ to $+50°$ C. and pressures of from less than 1 to 200 atmospheres, the mole ratio of hydrogen bromide to said compound being about 1:1, separating by distillation the resulting reaction mixture into a first fraction comprising a lower boiling essentially linear product fraction and a higher boiling essentially cyclodimerized product fraction, dehydrobrominating said lower boiling fraction, recycling the resulting dehydrobrominated fraction to said reaction zone and recovering the cyclodimerized product from said higher boiling cyclodimerized product fraction by crystallization from cold pentane.

11. A process for the preparation of cyclodimerized compounds which comprises contacting a mixture of unsaturated compounds comprising about 60% of allene and methylacetylene and about 40% propylene with hydrogen bromide in the absence of a catalyst at temperatures of from about $-100°$ to $+50°$ C. and pressures of from less than 1 to 200 atmospheres, the mole ratio of hydrogen bromide to said mixture being about 1:1 separating the resulting cyclodimerized products as a bottoms fraction by distillation, and recovering said cyclodimerized products from said bottoms fraction by crystallization from cold pentane.

12. A composition of matter having the general formula:

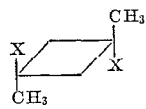

wherein X represents a halogen selected from the group consisting of chlorine and bromine.

13. A composition of matter having the general formula:

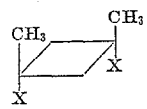

wherein X represents a halogen selected from the group consisting of chlorine and bromine.

14. Cis-1,3-dichloro-1,3-dimethylcyclobutane.
15. Trans-1,3-dichloro-1,3-dimethylcyclobutane.
16. Cis-1,3-dibromo-1,3-dimethylcyclobutane.
17. Trans-1,3-dibromo-1,3-dimethylcyclobutane.

18. A process for the preparation of cyclodimerized products which comprises reacting an unsaturated hydrocarbon compound selected from the group consisting of allene, homologs of allenes, homologs of acetylenes, and mixtures thereof with hydrogen chloride at temperatures of from about $-100°$ to $+50°$ C. and pressures of from less than 1 to 200 atmospheres, separating the resulting cyclodimerized products from the reaction mixture as a bottoms fraction by distillation, and recovering said cyclodimerized products from said bottoms fraction by crystallization from cold pentane.

19. A process for the preparation of cyclodimerized products which comprises reacting an unsaturated hydrocarbon compound selected from the group consisting of allene, homologs of allenes, homologs of acetylenes, and mixtures thereof with hydrogen chloride at temperatures of from about $-100°$ to $+50°$ C. and pressures of from less than 1 to 200 atmospheres, separating the resulting cyclodimerized products from the reaction mixture by gas-liquid chromatography, and recovering the cyclodimerized products by crystallization from cold pentane.

20. A process for the preparation of cyclodimerized products which comprises reacting an unsaturated hydrocarbon compound selected from the group consisting of allene, homologs of allenes, homologs of acetylenes, and mixtures thereof with hydrogen bromide at temperatures of from about $-100°$ to $+50°$ C. and pressures of from less than 1 to 200 atmospheres, separating the resulting cyclodimerized products from the reaction mixture by gas-liquid chromatography means, and recovering the cyclodimerized products.

References Cited

UNITED STATES PATENTS 3,142,710   7/1964   Arganbright _____ 260—663

OTHER REFERENCES

Jacobs et al.: J. Am. Chem. Soc., vol. 82, pp. 6397 to 6403 (1960).

Sheehan et al.: J. Am. Chem. Soc., vol. 71, pp. 1964 to 1966 (1949).

Avram et al.: Chem. Abst., vol. 54, col. 8664i (1960).

Kharasch et al.: J. Am. Chem. Soc., vol. 57, pp. 2463 to 65 (1935).

Griesbaum et al.: J. Am. Chem. Soc., vol. 58, p. 3151 (1965).

LEON ZITVER, *Primary Examiner.*

M. JACOB, *Assistant Examiner.*